(12) United States Patent
Choudhary et al.

(10) Patent No.: US 10,860,515 B2
(45) Date of Patent: Dec. 8, 2020

(54) INTEGRATED INPUT/OUTPUT MANAGEMENT

(71) Applicant: Intel Corporation, Santa Clara, CA (US)

(72) Inventors: Swadesh Choudhary, Mountain View, CA (US); Bahaa Fahim, Santa Clara, CA (US); Mahesh Wagh, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 204 days.

(21) Appl. No.: 16/014,012

(22) Filed: Jun. 21, 2018

(65) Prior Publication Data

US 2019/0050362 A1 Feb. 14, 2019

(51) Int. Cl.
| | |
|---|---|
| *G06F 11/00* | (2006.01) |
| *G06F 13/40* | (2006.01) |
| *G06F 11/07* | (2006.01) |
| *G06F 13/42* | (2006.01) |
| *G06F 11/10* | (2006.01) |
| *G06F 11/18* | (2006.01) |

(52) U.S. Cl.
CPC ...... *G06F 13/4068* (2013.01); *G06F 11/0745* (2013.01); *G06F 11/0751* (2013.01); *G06F 11/0772* (2013.01); *G06F 11/1004* (2013.01); *G06F 11/18* (2013.01); *G06F 13/42* (2013.01)

(58) Field of Classification Search
CPC ............ G06F 11/0745; G06F 11/0751; G06F 11/0772; G06F 11/18; G06F 11/1004; G06F 11/1608; G06F 11/1629; G06F 11/1654

See application file for complete search history.

(56) References Cited

U.S. PATENT DOCUMENTS 6,173,414 B1 * 1/2001 Zumkehr ............ G06F 11/1654 714/11
2019/0180526 A1 * 6/2019 Mehdizade ............ G07C 5/085

* cited by examiner

*Primary Examiner* — Philip Guyton
(74) *Attorney, Agent, or Firm* — Viering Jentschura & Partner MBB

(57) ABSTRACT

Herein is disclosed an integrated input/output ("I/O") processing system, comprising an I/O port, configured to receive I/O data and to deliver the I/O data to one or more processors; one or more processors, further comprising a first processing logic and a second processing logic, wherein the one or more processors are configured to deliver the received I/O data to the first processing logic and to the second processing logic, and wherein the first processing logic and the second processing logic are configured to redundantly process the I/O data; and a comparator, configured to compare an output of the first processing logic and an output of the second processing logic.

18 Claims, 8 Drawing Sheets

| Table 1 | Table 2 |
|---------|---------|
| WrA | WrA |
| WrB | WrA' |
| RdC | WrB |
| WrD | WrB' |
| | RdC |
| | RdC' |
| | WrD |
| | WrD' |
| 402 | 404 |

400

INTEGRATED INPUT/OUTPUT MANAGEMENT

TECHNICAL FIELD

Various aspects of the disclosure relate generally to the hardware management of integrated input/output data.

BACKGROUND

In certain applications, input/output ("I/O") data must be received and processed with a high degree of accuracy. Although some accuracy may be increased by performing I/O operations on multiple redundant processors, the addition of processors for this purpose is associated with an additional expense, which may be undesirable.

SUMMARY

Herein is disclosed an integrated input/output ("I/O") processing system, comprising an I/O port, configured to receive I/O data and to deliver the I/O data to one or more processors; one or more processors, further comprising a first processing logic and a second processing logic, wherein the one or more processors are configured to deliver the received I/O data to the first processing logic and to the second processing logic, and wherein the first processing logic and the second processing logic are configured to redundantly process the I/O data; and a comparator, configured to compare an output of the first processing logic and an output of the second processing logic.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
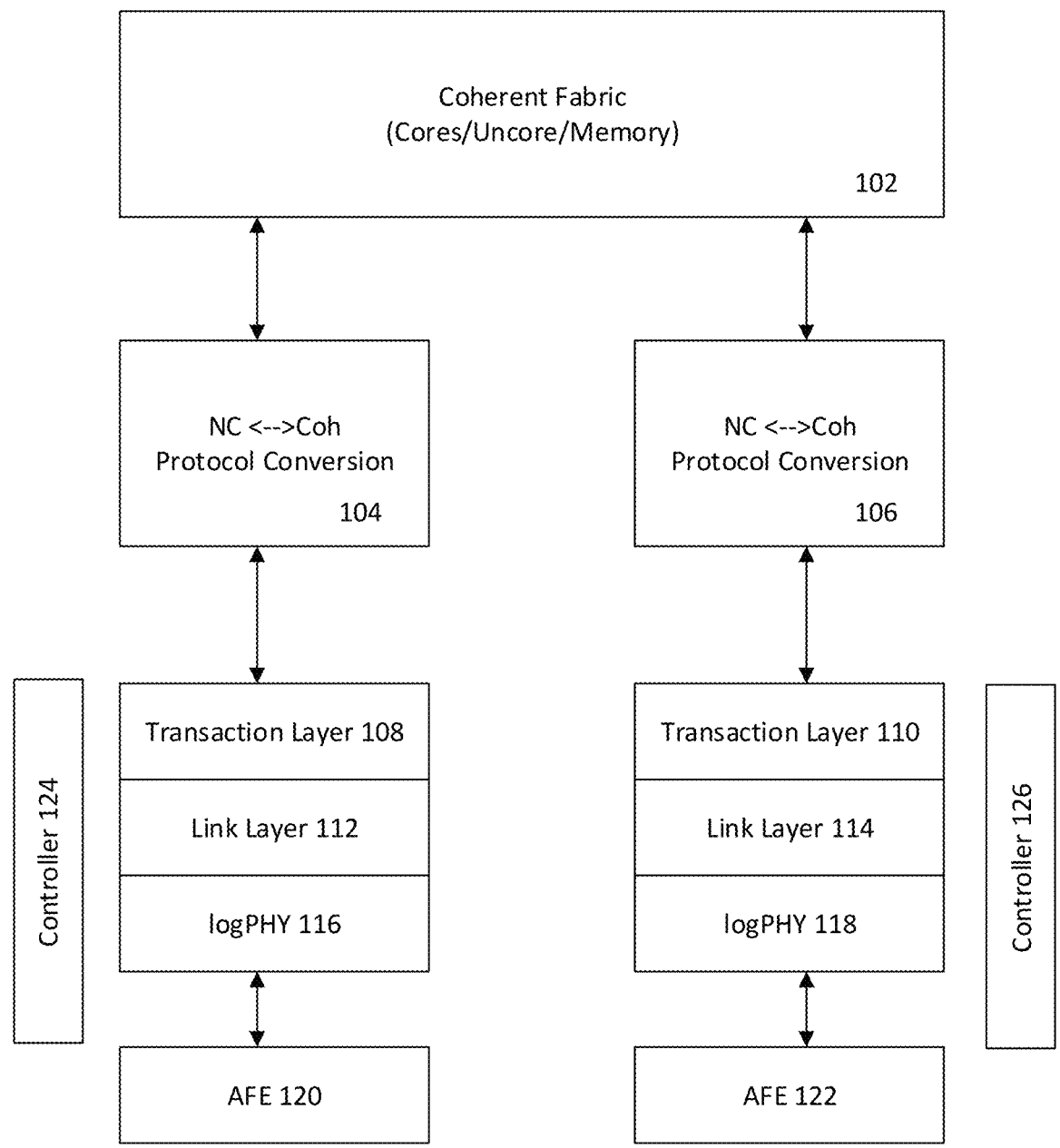
FIG. 1 shows a conventional I/O processing configuration without integrated processor-based hardware redundancy.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Many motor vehicles now include some level of ADAS, which are systems that strive to assist the driver with one or more aspects of the driving process. Most ADAS systems are designed with the goal of increased safety. The number of ADAS applications and their complexity is generally increasing, with an ultimate goal of achieving a fully autonomous vehicle.

ADAS applications may require significant computational power. Moreover, at least to the safety-related applications in an ADAS system, there may be little room for computational error, since catastrophic danger may result. As such, many ADAS systems rely on integrated CPUs to control various aspects of the vehicle.

The integration of complex CPUs in automobiles brings an increased risk of hardware faults causing catastrophic corruption and failure. Because of the safety concerns regarding automobiles, and particularly automobiles having complete or even partial autonomy or computer-directed control, it is necessary to design a system that can provide a high level of safety. This is often achieved by building in redundancy into the ADAS processes.

One measure of vehicle safety is based on International Organization for Standardization ("ISO") 26262, entitled "Road vehicles—Functional safety," 2011. ISO 26262 provides a metric for risk classification, which is based on an Automotive Safety Integrity Level ("ASIL") rating. There are 4 ASILs identified by the standard: ASIL A, ASIL B, ASIL C, ASIL D. Of these, ASIL D is the strictest and thus corresponds to the highest level of safety. ASIL D generally requires lower single digit Failure in Time ("FIT") for the entire system. This requires detection of transient and permanent faults within a specified failure time window.

A completely autonomous driving machine may need to reach ASIL-D compliance at the platform, which, as mentioned, is typically achieved through redundant channels (multiple CPU systems operating on the same data set, with a safety comparator unit checking their results before actually committing them to the peripherals). This redundancy leads to significant costs for the redundant components, and therefore there are advantages to developing individual components that are able to offer the ASIL-D safety level.

Various strategies have been attempted to create an individual CPU that can provide ASIL-D level safety, such as on a system on chip ("SoC") with several integrated components, such as cores, uncore, memory controller, and integrated I/O. These strategies have included, for example, creating a core lockstep and uncore redundancy, but there remains a critical aspect related to the integrated I/O. It may be advantageous to utilize an integrated I/O stack to convert protocols from the load/store based protocols to coherent protocols used in the CPU that are not typically covered by previous schemes and contribute significant FIT numbers to the overall system. In this disclosure, the term "I/O stack" may also be referred to as processing logic, such that redundant I/O stack processing may be completed by a first processing logic and a second processing logic.

As mentioned, the safety concerns of ADAS applications often require the system to achieve high reliability standards in order to be commercially viable. A known method to achieve these high safety standards includes reliance on multi-channel systems such as redundant CPU systems running the same applications. This greatly increases the cost and power requirements of the CPU and associated peripherals. Utilizing, for example, a single CPU to achieve a ASIL-D safety level may allow for high safety standards while reducing overall costs, even despite the cost of additional die area.

FIG. 1 shows a known organization of CPU logical sub-blocks 100 with an emphasis on the integrated I/O stack. The Analog Front End circuits ("AFE") 120 122 interacts with the package pins to receive input data. The logical part of the Physical Layer of the IIO ("logPHY") 116 118 is responsible for link initialization and training and also hosts the link state machine for power management and link status. The Link Layer ("LL") 112 114 is predominately concerned with framing/de-framing rules, and the LL manages credits to and from the remote device. The transaction layer ("TL") 108 110 enables the protocol layer and software discovery and enumeration mechanisms. The protocol converter from non-coherent to Coherent domain ("NC<-> Coh") 104 106 implements any additional requirements for the protocol in terms of interaction with the CPU (for example, IO memory management unit for virtualization support, ordering enforcements for protocols like PCIe, caching mechanisms for performance improvements etc.). The coherent fabric 102 may be a the rest of the CPU containing the cores/uncores and memory controllers. Typically several of the IIO stacks are connected to a common coherent fabric to provide high I/O connectivity to the chipset and other I/O devices. The controllers 124 126 comprise the TL 108 110, the LL 112 114, and the logPHY 116 118.

Typical mechanisms for functional safety ("FuSa") on the CPU side focus on the coherent fabric (core lockstep, uncore redundancy etc.). The I/O stack contributes significant FIT. According to one aspect of the disclosure, the CPU logical sub-blocks may be organized according to a tightly coupled I/O lockstep configuration within a single CPU. This utilizes the determinism in the I/O stacks to ensure complete redundancy of the stack, thereby reducing the likelihood of failure. Using this method, FIT is reduced to virtually zero, since all digital logic is addressed in the main stack and a redundant stack, and therefore both transient and permanent faults are addressed. This configuration may be used in any situation where it is desired to minimize FIT, such as, for example, applications with a potential to affect safety. Such applications may comprise, but are not limited to, distance measuring instruments and actuator controls.

Figure 2:
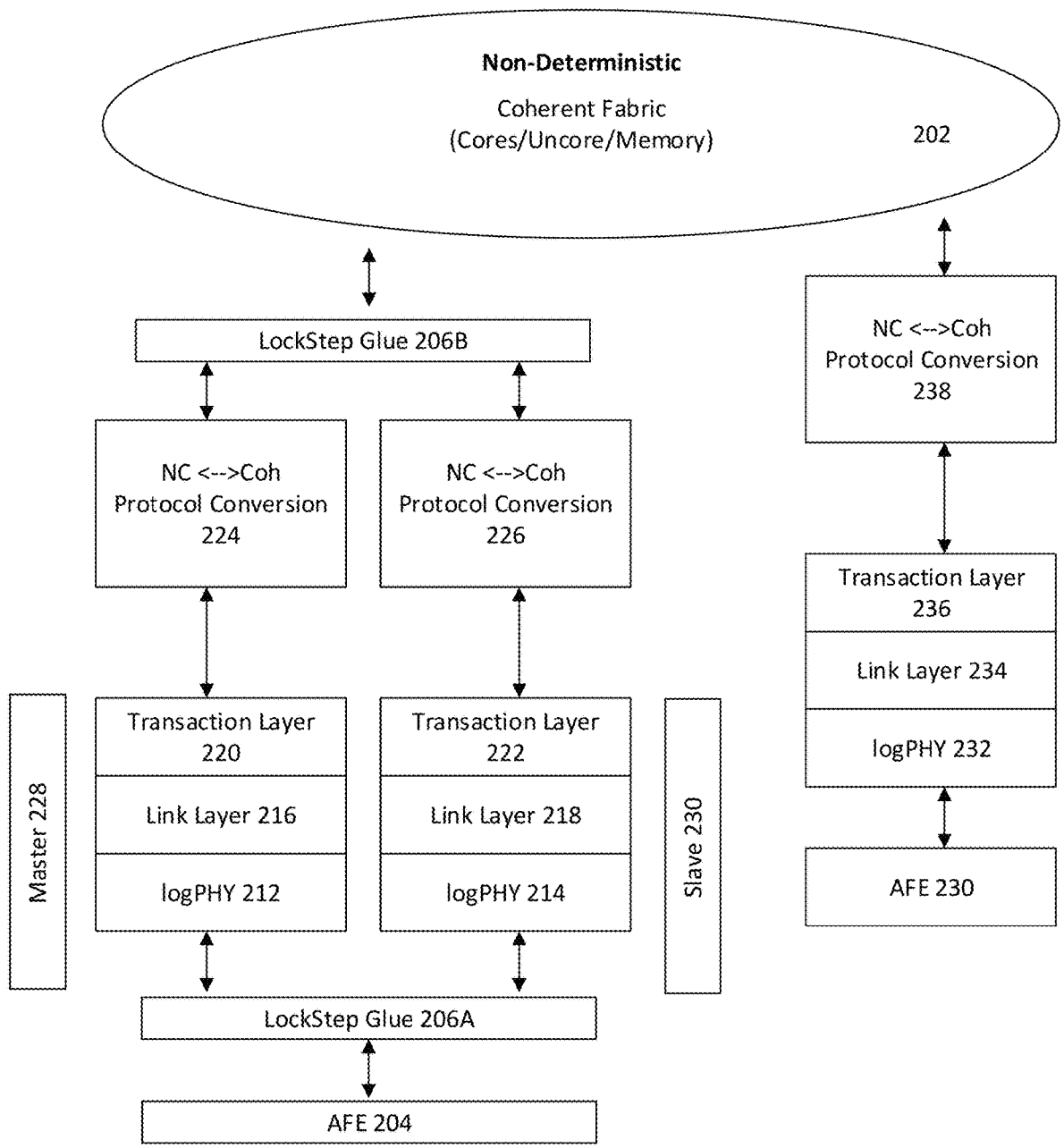
FIG. 2 shows a lockstep redundancy-based I/O processing configuration, according to a first aspect of the disclosure.

This tightly coupled I/O lockstep configuration within a single CPU 200 is depicted in FIG. 2. In this figure, the I/O stack on the left is setup for lockstep, and I/O stack on the right is not. With respect to the lockstep stack on the left, input data is received in the AFE 204 and proceed into the Lockstep domain with the Lockstep Glue 206A. From this point, the data proceed into two stacks, where they are redundantly processed. The data proceed into the master controller 228, which comprises the logPHY layer 212, the LL 216 and the transaction layer 220, and into the slave controller 230, which comprises the logPHY 214, the LL 218, and the transaction layer 222. The master control 228 delivers the data to the NC<--> Coh Protocol Conversion element 224, and the slave controller 230 delivers the data to the NC<--> Coh Protocol Conversion element 226. The results are compared in the Lockstep Glue 206B, where mismatches are detected as errors. According to one aspect of the disclosure, the Lockstep Glue 206B may be a redundancy comparison module. Successful comparisons are delivered to the coherent fabric 202.

The elements between Lockstep Glue 206A and 206B are inside the lockstep domain. The remaining elements are outside the lockstep domain and could be potentially non-deterministic. Since the AFE 204 is non-deterministic by design due to its mix of analog and digital logic, it cannot be within the lockstep domain. Nevertheless, this method for lockstep provides coverage for AFE, as most I/O protocols are protected with LL cyclic redundancy check ("CRC") over the link. In this case, since the CRC generation and checking logic is within the lockstep domain, the AFE 208 can be considered to be deterministic based on the LL CRC. Any relevant transient or permanents fault in AFE should show up as a CRC violation on the remote side of the link, assuming the remote side is also ASIL-D. The rest of the I/O stack should be designed to be deterministic. This may require additional care in cases of clock crossings and initialization of signals to ensure the determinism.

The Lockstep enabled I/O stack consists of a master I/O 228 stack and a slave I/O 230 stack. The master and slave I/O stacks may be physically adjacent, and the lockstep glue logic 206A 206B ensures that all inputs affecting determinism to the master and slave are assigned in a cycle-consistent manner. This includes power, resets, clocks and configuration information. Debug or testing related infrastructure or inputs need not be cycle consistent, as long as they have no impact on determinism, and functional traffic has no overlap with it. According to one aspect of the disclosure, the slave 230 may be configured to lag behind the master 228 by x cycles if staging is desired or required for signal routing on either interface, being any integer. The lockstep glue 206A 206B implements a checking mechanism for comparing outputs between the master 228 and slave 230 stacks on either side (AFE or coherent fabric), thereby detecting divergence through functional faults. According to one aspect of the disclosure, the number of signals used for comparison can be reduced by computing a checksum instead of comparing each bit. When this configuration is implemented, this may be configured to detect multiple bit upsets, but to route fewer signals to the comparison element for comparison purposes.

From the perspective of the rest of the system and software, the slave 230 is invisible. Although this configuration requires an initial firmware setup to enable the lockstep function, no additional actions need to be taken to enable the slave partition. According to one aspect of the disclosure, the slave outputs may be used only for comparison purposes, rather than providing data to the coherent fabric. That is, bits which are processed in the slave stack 230 may serve the singular purpose of comparison to the bits in the master stack 228 for error detection, but said bits in the slave stack 230 may not leave the Lockstep glue logic partition and are not passed into the coherent fabric 202.

Figure 3:
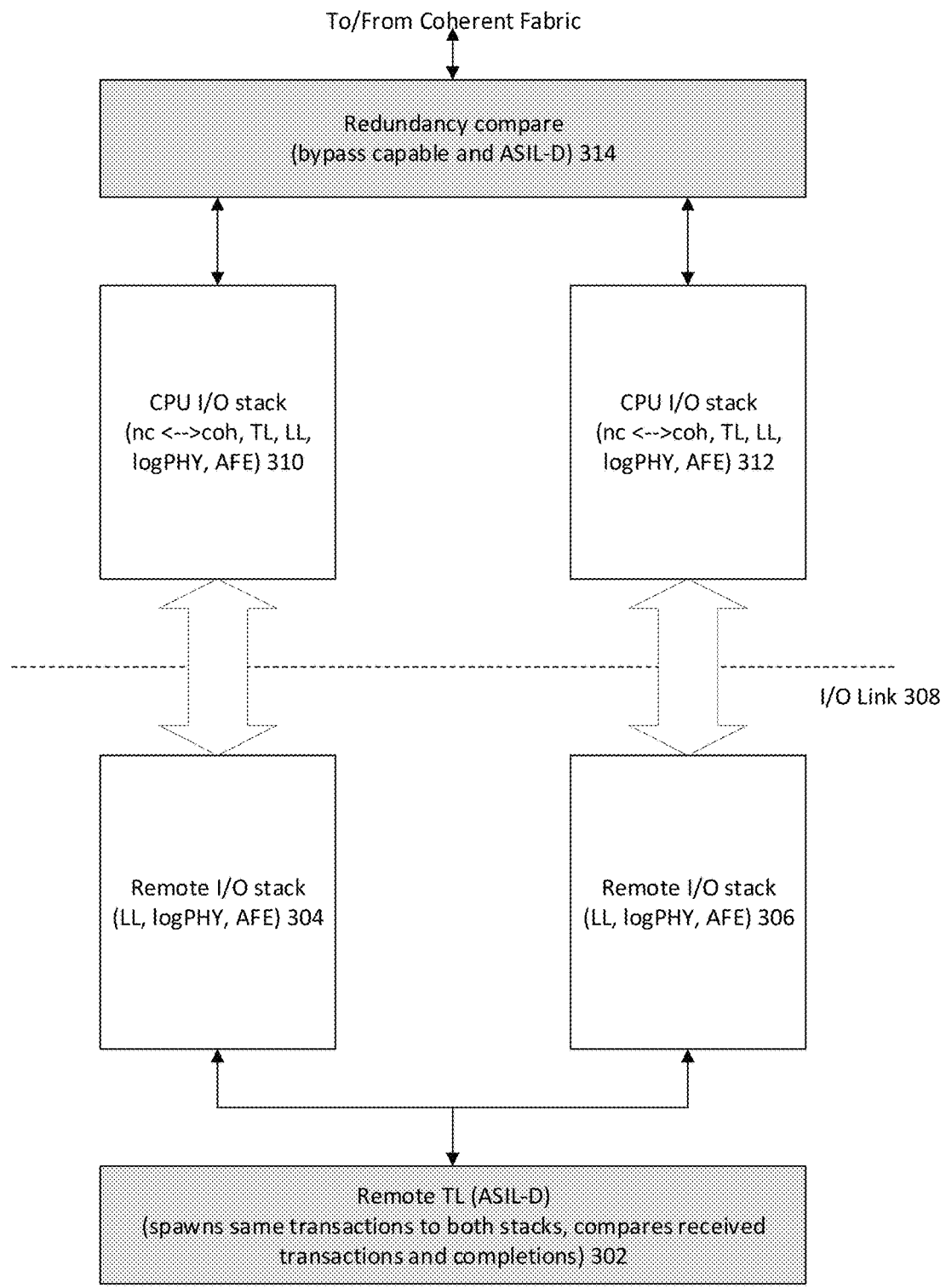
FIG. 3 shows a remote I/O stack redundancy-based I/O processing configuration, according to a second aspect of the disclosure.

FIG. 3 shows another aspect of the disclosure, which depicts a method of configuring the redundancy between different I/O stacks 300. This method may extend beyond a single CPU boundary by relying on a remote I/O stack for processing. In this method, a remote TL 302 sends an identical transaction to two processing stacks. These two identical transactions are received by a first remote stack 304 and a second remote stack 306. The remote stacks forward the transactions to the I/O link 308. I/O data from the I/O link 308 is then delivered to the local CPU stacks 310 and 312. CPU I/O stacks 310 312 comprise AFE, logPHY, LL, TL, and nc<--> coh 310 312. The bits from the CPU I/O stacks 310 and 312 are passed to the redundancy compare element 314.

This method places the onus of generating redundant traffic for multiple I/O stacks outside the CPU. The CPU is aware that stacks carry redundant traffic, and the CPU performs checksum comparisons before forwarding transactions to the coherent fabric. Because the stacks receive the same protocol inputs from the remote side, the transactions arrive within a pre-determined time window. This, however, requires a measure of control and handling on the protocol stack from both the remote side and the CPU side. This method also permits both transient and permanent faults to be covered through redundancy. The redundancy comparison component 314 and the remote TL component 302 may be ASIL-D compliant and will contribute FIT to the overall system. More software intervention may be required during enumeration time, but after completion of stacks setup, the applications become agnostic of the redundancy. This option may provide increased flexibility compared to the method of FIG. 2 because, in the event that the redundancy is not required, the additional I/O port can be used for a separate I/O device based on its reliance different remote stacks. This requires bypassing the redundancy compare logic on the CPU side.

As shown in FIG. 3, the two stacks are separate from the Link Layer onwards and thereby have independent credit control and link management. The two stacks are, however, common from the protocol side. This requires that the software is aware that two links are present between the CPU and the remote side during boot/enumeration. However, the protocol layer is only aware of one link, and the redundant transactions are spawned in hardware by the gray boxes for their respective directions. This method utilizes on ordering enforcement, which is common in many load/store serial interconnects such as Peripheral Component Interconnect Express ("PCIe"), to ensure that traffic sent across the link is processed in the same order on both sides of the stack, such that transactions can be appropriately committed to the coherent fabric. To enforce this, the redundancy compare block may backpressure one of the stacks until the transactions from the other stack catch up. This may be necessary, such as where mismatches occur due to internal delays. Thus, the boundary drawn for redundancy comparison must be before transferring transactions to the un-ordered domain in the coherency fabric. Where the memory must be read, it may be necessary that completions are returned from the stacks in a similar order, such that the remote TL is able to perform the necessary comparison. This may be achieved according to any known method including, but not limited to, pre-allocating completion space on the remote stack TL.

According to another aspect of the disclosure, the redundant traffic may be processed through the same I/O stack. This method achieves increased economy in terms of processor area; however, it may have a higher cost in achieving coverage of the logic in the stack, as well as requiring additional bandwidth over the I/O link. According to this aspect, redundant transactions are spawned on the same I/O link, such that each transaction is immediately followed by a redundant copy. The CPU is programmed via firmware for this configuration, and this thus aware that every transaction has a redundant subsequent copy. According to one aspect of the disclosure, in situations when the system of FIG. 3 is implemented, but when the redundancy disclosed herein is not desired, the redundant port may be converted to an additional port for addition I/O.

Figure 4:
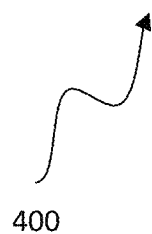
FIG. 4 shows a table for a single-stack redundancy-based I/O processing configuration according to a third aspect of the disclosure.

FIG. 4 shows a redundancy model 400 according to this aspect of the disclosure. The original transactions are depicted in 402 as WrA, WrB, RdC, and WrD. Each transaction is duplicated and processed, such that stack comprises a first transaction immediately followed by its duplication, a second transaction immediately followed by its duplication, and so forth. This is depicted in 404 as showing WrA, WrA', WrB, WrB', RdC, RdC', and WrD'. The original transaction and the duplicated transaction are compared, and the duplicated transaction is discarded by the redundancy compare module.

Figure 5:
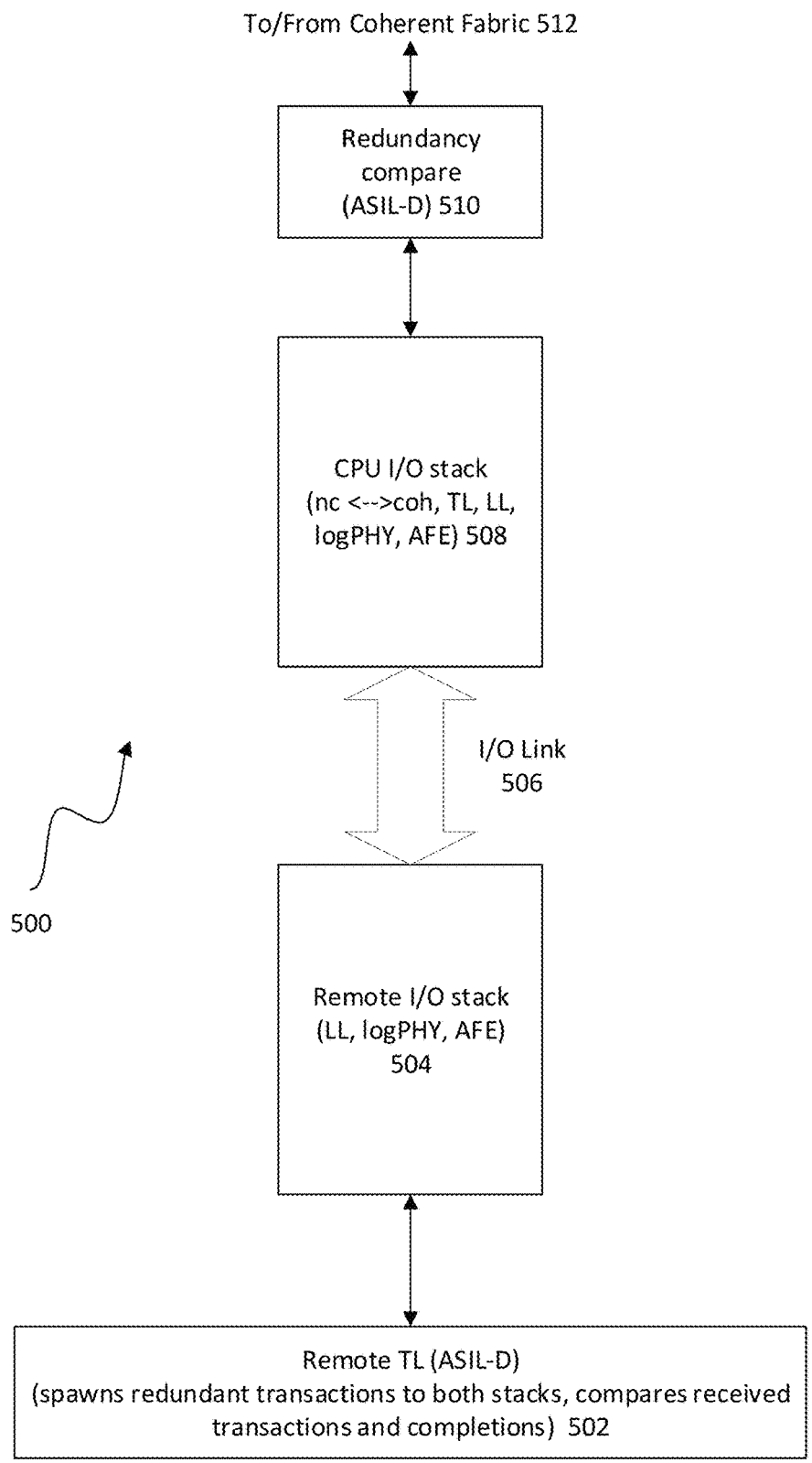
FIG. 5 shows a single-stack redundancy-based I/O processing configuration according to a third aspect of the disclosure.

FIG. 5 depicts the operational model to the duplicated stack transactions as described above in FIG. 4. As depicted in FIG. 5, the remote TL unit 502 spawns redundant transactions to remote I/O stack 504, such that each transaction is followed by a redundant transaction. The original and the redundant transaction are transmitted upward through the modules until they are compared. The products of the remote I/O stack 504 are delivered to the I/O link 506, which in turn delivers its transactions to the CPU I/O stack 508. The CPU I/O stack 508 delivers to the redundancy compare module 510. The redundancy compare module 510 performs a checksum comparison on the transaction and the redundant transaction. Assuming the transaction and redundant transaction pass the checksum, the redundancy compare module 510 discards the redundant transaction and transfers the data to the coherent fabric 512. The redundancy compare module may be a comparator.

Figure 6:
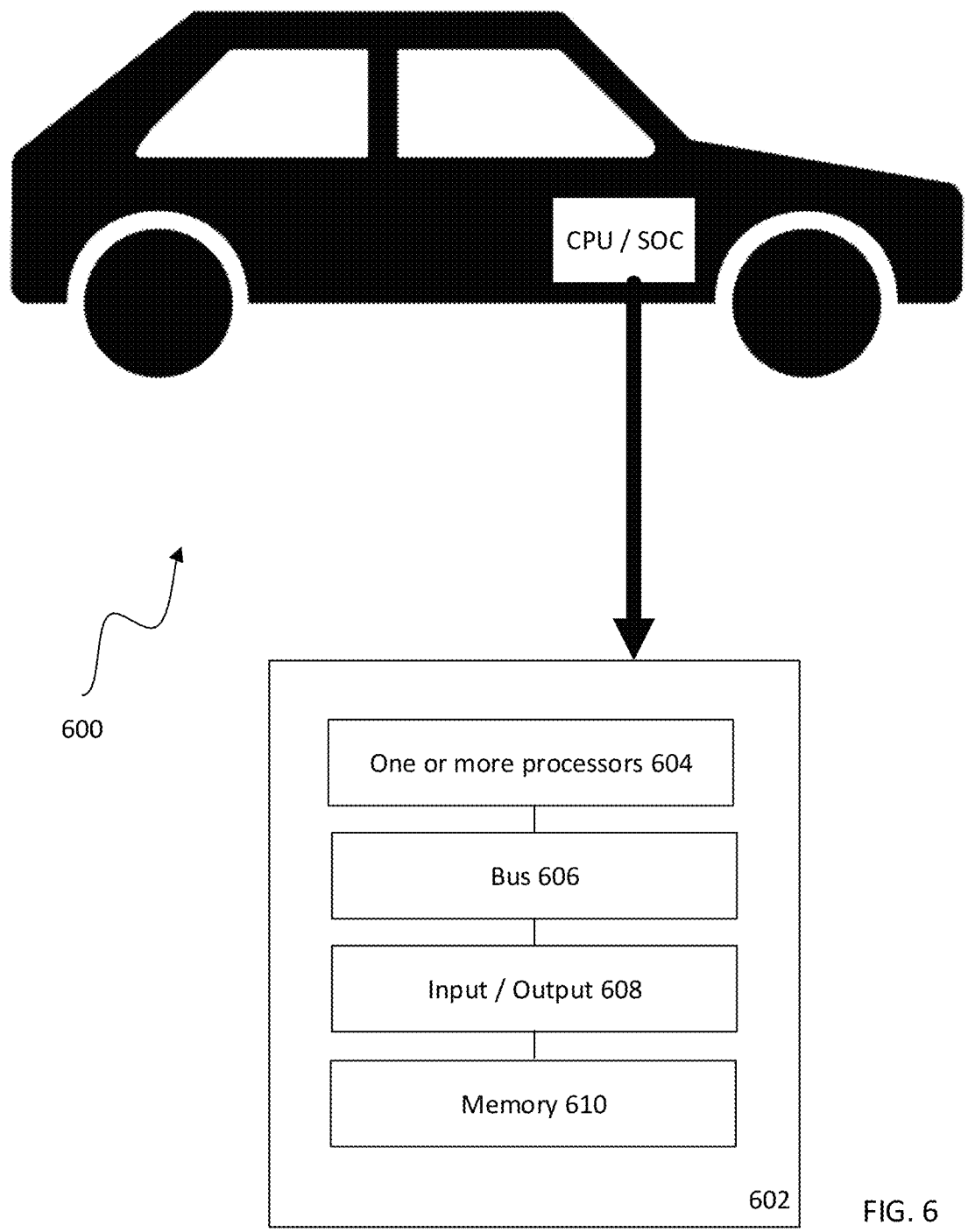
FIG. 6 shows a processor configuration as part of an advanced drive-assistance system.

FIG. 6 shows a CPU or System on chip arrangement for the I/O processing disclosed herein, as equipped for a vehicle 600. The CPU or System on Chip arrangement 602 may be used in any vehicle, whether as part of an autonomous vehicle, and automated driver assistance system, or otherwise. The arrangement may comprise one or more processors 604, configured to receive I/O information and configured to process the I/O information within a first stack or within a plurality of stacks. The one or more processors may be configured to compare the results of the stack processing for identity. The arrangement may further comprise a bus 606, which is configured to connect the one or more processors to an input output device. The arrangement may comprise one or more input output devices 608, configured to provide data to the bus and the one or more processors. The arrangement may comprise a memory 610, which may be configured to store or buffer I/O stack results for comparison.

Figure 7:
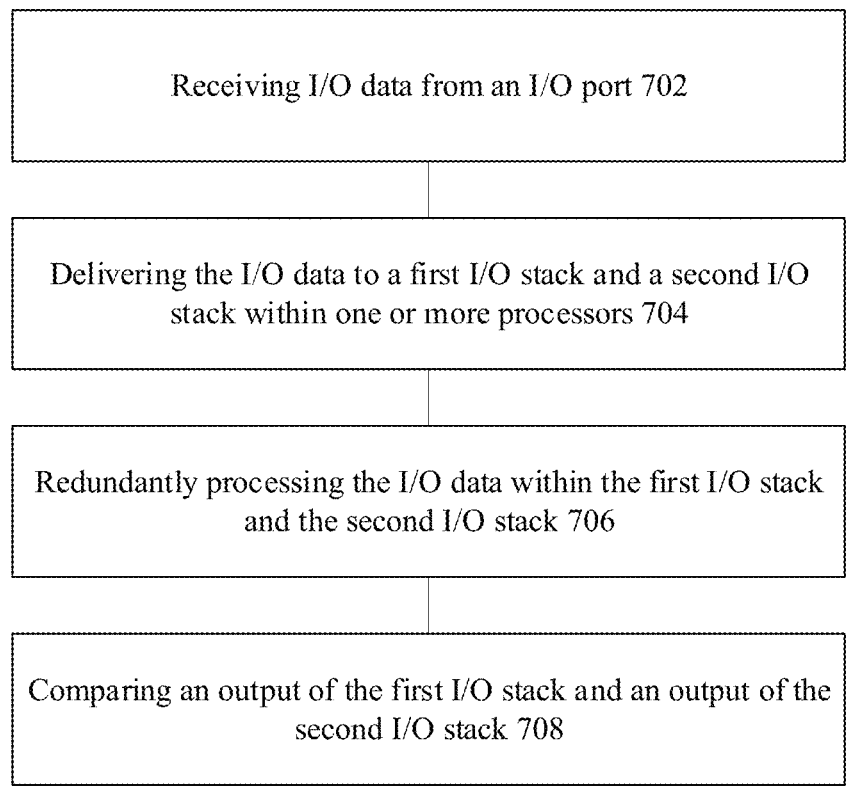
FIG. 7 shows a first method of redundancy-based I/O processing.

FIG. 7 shows a method of integrated input/output ("I/O") processing, according to one aspect of the disclosure, said method comprising receiving I/O data from an I/O port 702 and delivering the I/O data to a first I/O stack and a second I/O stack within one or more processors 704; redundantly processing the I/O data within the first I/O stack and the second I/O stack 706; and comparing an output of the first I/O stack and an output of the second I/O stack 708.

Figure 8:
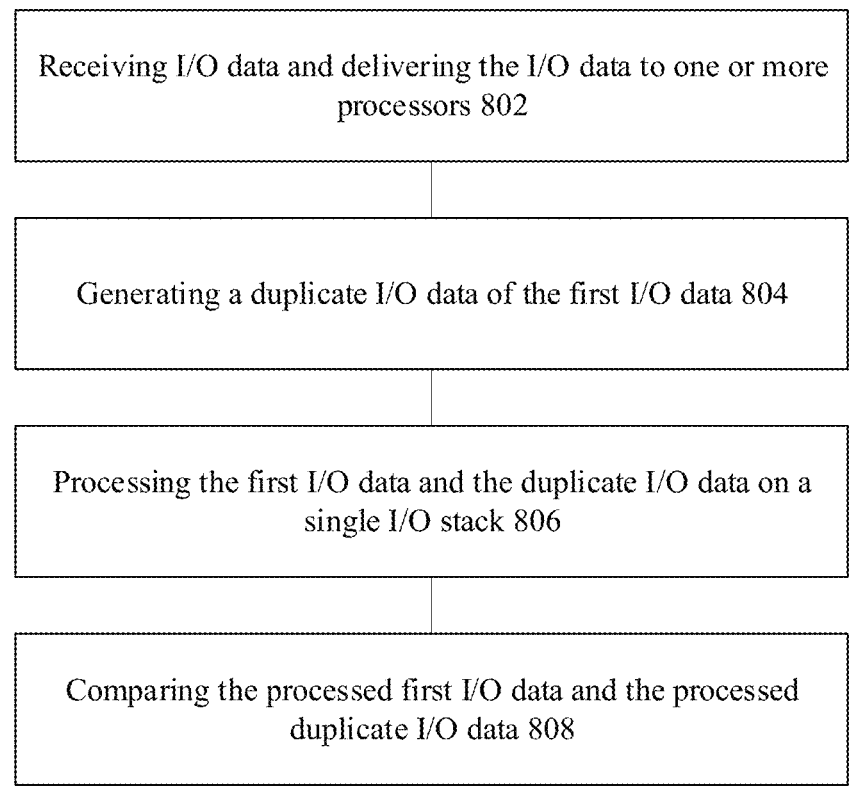
FIG. 8 shows a second method of redundancy-based I/O processing.

FIG. 8 shows a method of integrated input/output ("I/O") processing, according to one aspect of the disclosure, said method comprising receiving I/O data and delivering the I/O data to one or more processors 802; generating a duplicate I/O data of the first I/O data 804; processing the first I/O data and the duplicate I/O data on a single I/O stack 806; and comparing the processed first I/O data and the processed duplicate I/O data 808.

Using this method, only half the bandwidth over the link is available for regular traffic. This approach also requires that data committed to coherent fabric be in the same order as received on the link, to avoid aliasing between regular traffic and redundant traffic. As an example, the stream of traffic from the Remote I/O Stack shown in Table 1 may be considered. Table 2 gives the corresponding stream after the remote stack has duplicated transactions (WrA', WrB' etc. are the redundant packets). The redundancy compare module in this case discards the redundant transaction.

In a similar manner, when completions are collected by the remote I/O stack, it must be aware that each received completion transaction layer packet (TLP) has a redundant copy behind it that it must use for checksum comparison.

The configurations depicted in FIGS. 3 through 5 depend on the notion that the order between transactions is maintained within the I/O stack, which is a requirement for most Load/Store based protocols such as PCIe. The methods may also require the intervention of components from outside the CPU.

According to another aspect of the disclosure, the configurations depicted in FIGS. 3 through 5 may be used simultaneously or in a complementary fashion to further reduce the overall FIT for more fault tolerant I/Os, such as for applications running fault tolerant algorithms. For example, both the system of FIG. 3 and the system of FIGS.

4 and 5 may be combined together. Such a combination would be expected to provide at least some addition reduction in FIT.

The integrated I/O configuration may be configured as a processing system comprising an I/O port, configured to receive I/O data and to deliver the I/O data to one or more processors; one or more processors, further comprising a first I/O stack and a second I/O stack, wherein the one or more processors are configured to deliver the received I/O data to the first I/O stack and to the second I/O stack, and wherein the first I/O stack and the second I/O stack are configured to redundantly process the I/O data; and a comparator, configured to compare an output of the first I/O stack and an output of the second I/O stack.

The comparator is configured to determine an identity between the output of the first I/O stack and the second I/O stack, and in the case that the identity satisfies a predetermined threshold, to deliver the output of the first I/O stack to a next region of the one or more processors. The comparator may be configured such that a complete identity between the output of the first I/O stack and the second I/O stack is required, thereby requiring symmetry of outputs. Alternatively, the comparator may be configured to permit less than symmetrical output, such as when taking into account log entries, processing order, or otherwise.

Where the required identity is not met, a failure, such as a FIT, occurs, and a failure notification is sent. Such a failure may be addressed in a predetermined manner by escalating to a failure protocol. The failure may be reported by issuing a failure signal, which may be sent from the one or more processors to any other processor or device. The failure may trigger one or more failure applications or failure protocols.

According to one aspect of the disclosure, it is anticipated that the I/O stacks will be integrated I/O stacks within the one or more processors. Depending on the aspect disclosed herein, the I/O stacks may be jointly within a single processor or spread over 2 or more processors. The I/O stacks may be located within a single CPU or system-on-a-chip. One I/O stack may be located within a single CPU or system on Chip while the other I/O stack may be located in a remote CPU or system-on-a-chip.

Where the comparison of the I/O stack outputs satisfies the predetermined criteria, one of the I/O stack outputs may be forwarded to a coherent fabric. The coherent fabric may be understood to be a core region, an uncore region, or a memory region. Where an output of an I/O stack is forwarded to the coherent fabric, the redundant I/O stack output may be discarded.

Each I/O stack may comprise a plurality of layers for performing I/O stack functions. These layers may include, but are not limited to, a logPHY layer, a link layer, and a transaction layer. The logPHY layer refers to the logical part of the Physical Layer of the input/output, which is responsible for link initialization and training and also hosts the link state machine for power management and link status. The Link Layer may implement at least one or framing or de-framing rules. The transaction layer may be configured to perform at least one of enabling a protocol layer, enabling software discovery and performing an enumeration mechanism. Furthermore, the I/O stack may comprise a nc<--> Coh layer, which is a protocol converter from a non-coherent domain to a coherent domain and is configured to perform input/output memory management unit for virtualization support.

When the first I/O stack and the second I/O stack are located within the same processor, they may be located adjacently. This may be particularly desirable in the configuration according to the first aspect of the disclosure, wherein a master I/O stack in a slave I/O stack or run in parallel, redundantly, and wherein there results are compared for forwarding into the coherent fabric.

The I/O processing system may further comprise a lockstep module configured to receive the I/O data from the I/O port and to deliver the received I/O data to the first I/O stack and to redundantly deliver the received I/O data to the second I/O stack, and wherein the delivery of the received I/O data by the one or more processors occurs via the lockstep module.

The two I/O stacks may be configured such that the first I/O stack is a master I/O stack and the second I/O stack is a slave I/O stack. The slave I/O stack may be configured to perform all, or less than all, of the actions of the master I/O stack. The slave stack may be configured such that it is invisible to one or more other aspects of the processors. The slave stack may be configured to perform calculations solely for the purpose of comparison with the master stack, to increase accuracy and safety through implementation of redundancy.

The comparator may be configured to compare each output of the first I/O stack and the second I/O stack, or to compare less than each output of the first I/O stack and the second I/O stack. For example, comparisons may occur for each output, for a predetermined fraction of the outputs, at sporadic intervals, upon certain thresholds being met, or otherwise. The comparator may be configured to compare the output data, or to perform one or more checksum operations on the output data.

According to another aspect of the disclosure, the I/O stacks may be configured such that the first I/O stack is in a first processor and the second I/O stack is in a second processor. That is, with respect to the I/O CPU for a given I/O function, the redundant calculations related to the corresponding I/O data may be performed in one or more processors outside of the given CPU. Where this occurs, the output of the redundant calculations may be transferred to the given CPU for comparison with the non-redundant calculations. Because the calculations may be performed on different CPUs, they may be completed at different times; however, it is anticipated that output of the redundant steps outside of the given CPU may be delivered to the given CPU within a predetermined threshold following availability of the output of the non-redundant steps. For comparison between the two outputs, the output of the non-redundant I/O stack may be buffered or stored in memory until availability of the redundant I/O stack output. In the event that the buffer or memory becomes full, or that it is no longer possible to buffer the non-redundant output for comparison, the CPU may apply backpressure to the first I/O stack (the master or non-redundant I/O stack) to slow output such that greater equilibrium can be achieved.

The redundancy comparator may be located in the main CPU for the I/O task, in the main processor for the I/O task on the System on Chip, or otherwise.

The I/O processing system may comprise an I/O port, configured to receive I/O data and to deliver the I/O data to one or more processors; one or more processors, further comprising an I/O data duplication circuit, configured to receive a first I/O data, to generate a duplicate I/O data of the first I/O data, and to deliver the first I/O data and the duplicate I/O data to an I/O stack; an I/O stack, configured to process the first I/O data and the duplicate I/O data, and to deliver the processed first I/O data and the processed duplicate I/O data to a comparator; and the comparator, configured to compare the processed first I/O data and the processed duplicate I/O data.

According to this aspect of the disclosure, the comparator may be configured to determine an identity between the processed first I/O data and the processed duplicate I/O data. Because it is expected that the duplicate or redundant I/O data immediately follow the non-duplicate or non-redundant I/O data, every two output units may be collected and compared to one another. In the event that the compared data satisfy a predetermined threshold, the comparator may be configured to deliver the non-redundant data, that is the data from the first I/O, to a next region of the one or more processors.

The term "next region" is used generally to indicate a forwarding of the data for further use. This may be a forwarding to the coherent fabric, whether to a core, and uncore, a memory, or otherwise. In the event that the comparison between data units does not reveal an identity above a predetermined threshold, the one or more processors, or any of the elements described herein, may be configured to issue a failure. The issued failure may be a failure bit, a failure signal, or otherwise.

The I/O processing system may comprises an I/O stack with at least a logPHY layer, a link layer, and a transaction layer. The logPHY layer is a logical part of the physical layer for an input/output; the Link Layer implements at least one or framing or de-framing rules; and the transaction layer is configured to perform at least one of enabling a protocol layer, enabling software discovery and performing an enumeration mechanism. The I/O processing system may further comprise a nc<--> Coh layer, whereby said layer is a protocol converter from a non-coherent domain to a coherent domain and is configured to perform input/output memory management unit for virtualization support.

The I/O processing system may be configured as part of an ADAS, designed to perform one or more tasks to assist a vehicle was driving. The system may be configured to provide a high level of reliability or safety in order to meet one or more standards for an ADAS, a vehicle, or otherwise. The processing system may be configured to operate as a function within an autonomous vehicle. The autonomous vehicle may be configured to perform one or more driving functions independently of human input.

The system, device, and methods described herein include hardware-based, redundant, integrated I/O stack calculations. A hardware-based system may be preferable to a software-based system, at least because of expense and ease of implementation in new environments. Software-based redundancy applications may be difficult and time-consuming to program, thereby increasing overall expense. Moreover, such software solutions may be hardware-specific, which may limit the hardware types or configurations that are usable with a given software-based redundancy solution. By incorporating said redundancy calculation into hardware, it can be more readily implemented in a variety of configurations, thereby reducing price. This may be true, even considering any additional expense related to additional processors or silicone surface.

Moreover, software-based redundancy solutions may be unable to employ redundancy strategies to check for errors in certain portions of the hardware. Depending on the configuration, various aspects of the hardware may be unavailable to such software checks, and errors resulting in these areas may be undiscoverable in a given software solution. As such, a hardware-based solution may provide greater air detecting capabilities, and therefore greater accuracy and/or greater safety.

Further, various embodiments will be described in the following.

In Example 1, an integrated input/output ("I/O") processing system is disclosed, comprising an I/O port, configured to receive I/O data and to deliver the I/O data to one or more processors; one or more processors, further comprising a first processing logic and a second processing logic, wherein the one or more processors are configured to deliver the received I/O data to the first processing logic and to the second processing logic, and wherein the first processing logic and the second processing logic are configured to redundantly process the I/O data; and a comparator, configured to compare an output of the first processing logic and an output of the second processing logic.

In Example 2, the I/O processing system of Example 1 is disclosed, wherein the comparator is configured to determine an identity between the output of the first processing logic and the second processing logic, and in the case that the identity satisfies a predetermined threshold, to deliver the output of the first processing logic to a next region of the one or more processors.

In Example 3, the I/O processing system of Examples 1 or 2 is disclosed, wherein the comparator is configured to determine an identity between the output of the first processing logic and the second processing logic, and in the case that the identity does not satisfy a predetermined threshold, to report a failure.

In Example 4, the I/O processing system of any one of Examples 1 to 3 is disclosed, wherein the first processing logic and the second processing logic are integrated processing logics within the one or more processors.

In Example 5, the I/O processing system of any one of Examples 2 to 4 is disclosed, wherein the next region of the one or more processors is a coherent fabric.

In Example 6, the I/O processing system of any one of Examples 2 to 5 is disclosed, wherein the next region of the one or more processors is a core region, an uncore region, or a memory region.

In Example 7, the I/O processing system of any one of Examples 1 to 6 is disclosed, wherein the first processing logic and the second processing logic each comprise a logical portion of a physical layer ("logPHY"), a link layer, and a transaction layer.

In Example 8, the I/O processing system of Example 7 is disclosed, wherein the logPHY layer is a logical part of the physical layer for an input/output.

In Example 9, the I/O processing system of Example 7 is disclosed, wherein the Link Layer implements at least one or framing or de-framing rules.

In Example 10, the I/O processing system of Example 7 is disclosed, wherein the transaction layer is configured to perform at least one of enabling a protocol layer, enabling software discovery and performing an enumeration mechanism.

In Example 11, the I/O processing system of Example 7 is disclosed, wherein nc<--> Coh is a protocol converter from a non-coherent domain to a coherent domain and is configured to perform input/output memory management unit for virtualization support.

In Example 12, the I/O processing system of any one of Examples 1 to 11 is disclosed, wherein the I/O processing system is configured to perform one or more operations of an Advanced Driver Assistance System.

In Example 13, the I/O processing system of any one of Examples 1 to 12 is disclosed, wherein the I/O processing system is configured to operate within an autonomous vehicle.

In Example 14, the I/O processing system of any one of Examples 1 to 13 is disclosed, wherein the first processing logic and the second processing logic are located within the same processor of the one or more processors.

In Example 15, the I/O processing system of any one of Examples 1 to 14 is disclosed, wherein the first processing logic and the second processing logic are located adjacently within the same processor of the one or more processors.

In Example 16, the I/O processing system of any one of Examples 1 to 15 is disclosed, further comprising a lockstep module configured to receive the I/O data from the I/O port and to deliver the received I/O data to the first processing logic and to redundantly deliver the received I/O data to the second processing logic, and wherein the delivery of the received I/O data by the one or more processors occurs via the lockstep module.

In Example 17, the I/O processing system of any one of Examples 1 to 16 is disclosed, wherein the first processing logic is a master processing logic and the second processing logic is a slave processing logic.

In Example 18, the I/O processing system of any one of Examples 1 to 17 is disclosed, wherein the comparator is configured to perform a checksum operation on the output of the first processing logic and the output of the second processing logic.

In Example 19, the I/O processing system of any one of Examples 1 to 13 is disclosed, wherein the first processing logic is in a first processor and the second processing logic is in a second processor.

In Example 20, the I/O processing system of Example 19 is disclosed, wherein an output of the second processing logic is delivered to the redundancy compare circuit for comparison with the output of the first processing logic.

In Example 21, the I/O processing system of Example 19 or 20 is disclosed, wherein the redundancy compare circuit is in the first processor.

In Example 22, the I/O processing system of any one of Examples 19 to 21 is disclosed, wherein the one or more processors are configured to receive the output of the second processing logic within a predetermined period following receipt of the output of the second processing logic.

In Example 23, the I/O processing system of any one of Examples 19 to 22 is disclosed, wherein the one or more processors are configured to backpressure the first processing logic to resolve an arrival time discrepancy between the output of the first processing logic and the output of the second processing logic.

In Example 24, the I/O processing system of any one of Examples 19 to 23 is disclosed, further comprising a memory to store an output of the first processing logic until receipt of a corresponding output of the second processing logic.

In Example 25, an input/output ("I/O") processing system is disclosed, comprising an input/output ("I/O") port, configured to receive I/O data and to deliver the I/O data to one or more processors; one or more processors, further comprising an I/O data duplication circuit, configured to receive a first I/O data, to generate a duplicate I/O data of the first I/O data, and to deliver the first I/O data and the duplicate I/O data to an processing logic; an processing logic, configured to process the first I/O data and the duplicate I/O data, and to deliver the processed first I/O data and the processed duplicate I/O data to a comparator; and the comparator, configured to compare the processed first I/O data and the processed duplicate I/O data.

In Example 26, the I/O processing system of Example 25 is disclosed, wherein the comparator is configured to determine an identity between the processed first I/O data and the processed duplicate I/O data, and in the case that the identity satisfies a predetermined threshold, to deliver the first processed I/O data to a next region of the one or more processors.

In Example 27, the I/O processing system of Example 25 or 26 is disclosed, wherein the comparator is configured to determine an identity between the processed first I/O data and the processed duplicate I/O data, and in the case that the identity does not satisfy a predetermined threshold, to report a failure.

In Example 28, the I/O processing system of Example 26 or 27 is disclosed, wherein the next region of the one or more processors is a coherent fabric.

In Example 29, the I/O processing system of Examples 26 to 28 is disclosed, wherein the next region of the one or more processors is a core region, an uncore region, or a memory region.

In Example 30, the I/O processing system of any one of Examples 25 to 29 is disclosed, wherein the processing logic comprises a logical portion of a physical layer ("logPHY"), a link layer, and a transaction layer.

In Example 31, the I/O processing system of Example 30 is disclosed, wherein the logPHY layer is a logical part of the physical layer for an input/output.

In Example 32, the I/O processing system of Example 30 is disclosed, wherein the Link Layer implements at least one or framing or de-framing rules.

In Example 33, the I/O processing system of Example 30 is disclosed, wherein the transaction layer is configured to perform at least one of enabling a protocol layer, enabling software discovery and performing an enumeration mechanism.

In Example 34, the I/O processing system of Example 30 is disclosed, wherein nc<--> Coh is a protocol converter from a non-coherent domain to a coherent domain and is configured to perform input/output memory management unit for virtualization support.

In Example 35, the I/O processing system of any one of Examples 1 to 34 is disclosed, wherein the I/O processing system is configured to perform one or more operations of an Advanced Driver Assistance System.

In Example 36, the I/O processing system of any one of Examples 1 to 34 is disclosed, wherein the I/O processing system is configured to operate within an autonomous vehicle.

In Example 37, the I/O processing system of any one of Examples 1 to 36 is disclosed, wherein the I/O data comprises at least one of power data, reset data, clock data, configuration data, or any combination thereof.

In Example 38, the I/O processing system of any one of Examples 1 to 37 is disclosed, wherein the one or more processors operate according to a Peripheral Component Interconnect Express protocol.

In Example 39, the I/O processing system of any one of Examples 3 to 37 is disclosed, wherein reporting a failure comprises outputting a failure signal.

In Example 40, an integrated input/output ("I/O") System on Chip is disclosed, comprising an I/O port, configured to receive I/O data and to deliver the I/O data to one or more processors; one or more processors, further comprising a first processing logic and a second processing logic, wherein the one or more processors are configured to deliver the received I/O data to the first processing logic and to the second processing logic, and wherein the first processing logic and the second processing logic are configured to redundantly process the I/O data; and a comparator, configured to compare an output of the first processing logic and an output of the second processing logic.

In Example 41, the I/O System on Chip of Example 40 is disclosed, wherein the comparator is configured to determine an identity between the output of the first processing logic and the second processing logic, and in the case that the identity satisfies a predetermined threshold, to deliver the output of the first processing logic to a next region of the one or more processors.

In Example 42, the I/O System on Chip of Examples 40 or 41 is disclosed, wherein the comparator is configured to determine an identity between the output of the first processing logic and the second processing logic, and in the case that the identity does not satisfy a predetermined threshold, to report a failure.

In Example 43, the I/O System on Chip of any one of Examples 40 to 42 is disclosed, wherein the first processing logic and the second processing logic are integrated processing logics within the one or more processors.

In Example 44, the I/O System on Chip of any one of Examples 41 or 42 is disclosed, wherein the next region of the one or more processors is a coherent fabric.

In Example 45, the I/O System on Chip of any one of Examples 41 to 44 is disclosed, wherein the next region of the one or more processors is a core region, an uncore region, or a memory region.

In Example 46, the I/O System on Chip of any one of Examples 40 to 45 is disclosed, wherein the first processing logic and the second processing logic each comprise a logical portion of a physical layer ("logPHY") layer, a link layer, and a transaction layer.

In Example 47, the I/O System on Chip of Example 46 is disclosed, wherein the logPHY layer is a logical part of the physical layer for an input/output.

In Example 48, the I/O System on Chip of Example 46 is disclosed, wherein the Link Layer implements at least one or framing or de-framing rules.

In Example 49, the I/O System on Chip of Example 46 is disclosed, wherein the transaction layer is configured to perform at least one of enabling a protocol layer, enabling software discovery and performing an enumeration mechanism.

In Example 50, the I/O System on Chip of Example 46 is disclosed, wherein nc<--> Coh is a protocol converter from a non-coherent domain to a coherent domain and is configured to perform input/output memory management unit for virtualization support.

In Example 51, the I/O System on Chip of any one of Examples 40 to 50 is disclosed, wherein the I/O System on Chip is configured to perform one or more operations of an Advanced Driver Assistance System.

In Example 52, the I/O System on Chip of any one of Examples 40 to 51 is disclosed, wherein the I/O System on Chip is configured to operate within an autonomous vehicle.

In Example 53, the I/O System on Chip of any one of Examples 40 to 52 is disclosed, wherein the first processing logic and the second processing logic are located within the same processor of the one or more processors.

In Example 54, the I/O System on Chip of any one of Examples 40 to 53 is disclosed, wherein the first processing logic and the second processing logic are located adjacently within the same processor of the one or more processors.

In Example 55, the I/O System on Chip of any one of Examples 40 to 54 is disclosed, further comprising a lockstep module configured to receive the I/O data from the I/O port and to deliver the received I/O data to the first processing logic and to redundantly deliver the received I/O data to the second processing logic, and wherein the delivery of the received I/O data by the one or more processors occurs via the lockstep module.

In Example 56, the I/O System on Chip of any one of Examples 40 to 55 is disclosed, wherein the first processing logic is a master processing logic and the second processing logic is a slave processing logic.

In Example 57, the I/O System on Chip of any one of Examples 40 to 56 is disclosed, wherein the comparator is configured to perform a checksum operation on the output of the first processing logic and the output of the second processing logic.

In Example 58, the I/O System on Chip of any one of Examples 40 to 57 is disclosed, wherein the first processing logic is in a first processor and the second processing logic is in a second processor.

In Example 59, the I/O System on Chip of Example 58 is disclosed, wherein an output of the second processing logic is delivered to the redundancy compare circuit for comparison with the output of the first processing logic.

In Example 60, the I/O System on Chip of Example 58 or 59 is disclosed, wherein the redundancy compare circuit is in the first processor.

In Example 61, the I/O System on Chip of any one of Examples 58 to 60 is disclosed, wherein the one or more processors are configured to receive the output of the second processing logic within a predetermined period following receipt of the output of the second processing logic.

In Example 62, the I/O System on Chip of any one of Examples 58 to 61 is disclosed, wherein the one or more processors are configured to backpressure the first processing logic to resolve an arrival time discrepancy between the output of the first processing logic and the output of the second processing logic.

In Example 63, the I/O System on Chip of any one of Examples 58 to 62 is disclosed, further comprising a memory to store an output of the first processing logic until receipt of a corresponding output of the second processing logic.

In Example 64, an input/output ("I/O") System on Chip is disclosed, comprising an input/output ("I/O") port, configured to receive I/O data and to deliver the I/O data to one or more processors; one or more processors, further comprising an I/O data duplication circuit, configured to receive a first I/O data, to generate a duplicate I/O data of the first I/O data, and to deliver the first I/O data and the duplicate I/O data to an processing logic; an processing logic, configured to process the first I/O data and the duplicate I/O data, and to deliver the processed first I/O data and the processed duplicate I/O data to a comparator; and the comparator, configured to compare the processed first I/O data and the processed duplicate I/O data.

In Example 65, the I/O System on Chip of Example 64 is disclosed, wherein the comparator is configured to determine an identity between the processed first I/O data and the processed duplicate I/O data, and in the case that the identity satisfies a predetermined threshold, to deliver the first processed I/O data to a next region of the one or more processors.

In Example 66, the I/O System on Chip of Example 64 or 65 is disclosed, wherein the comparator is configured to determine an identity between the processed first I/O data and the processed duplicate I/O data, and in the case that the identity does not satisfy a predetermined threshold, to report a failure.

In Example 67, the I/O System on Chip of Example 65 or 66 is disclosed, wherein the next region of the one or more processors is a coherent fabric.

In Example 68, the I/O System on Chip of Example 65 to 67 is disclosed, wherein the next region of the one or more processors is a core region, an uncore region, or a memory region.

In Example 69, the I/O System on Chip of any one of Examples 64 to 69 is disclosed, wherein the processing logic comprises a logical portion of a physical layer ("logPHY"), a link layer, and a transaction layer.

In Example 70, the I/O System on Chip of Example 69 is disclosed, wherein the logPHY layer is a logical part of the physical layer for an input/output.

In Example 71, the I/O System on Chip of Example 69 is disclosed, wherein the Link Layer implements at least one or framing or de-framing rules.

In Example 72, the I/O System on Chip of Example 69 is disclosed, wherein the transaction layer is configured to perform at least one of enabling a protocol layer, enabling software discovery and performing an enumeration mechanism.

In Example 73, the I/O System on Chip of Example 69 is disclosed, wherein nc<--> Coh is a protocol converter from a non-coherent domain to a coherent domain and is configured to perform input/output memory management unit for virtualization support.

In Example 74, the I/O System on Chip of any one of Examples 40 to 73 is disclosed, wherein the I/O System on Chip is configured to perform one or more operations of an Advanced Driver Assistance System.

In Example 75, the I/O System on Chip of any one of Examples 40 to 75 is disclosed, wherein the I/O System on Chip is configured to operate within an autonomous vehicle.

In Example 76, the I/O System on Chip of any one of Examples 40 to 75 is disclosed, wherein the I/O data comprises at least one of power data, reset data, clock data, configuration data, or any combination thereof.

In Example 77, the I/O System on Chip of any one of Examples 40 to 76 is disclosed, wherein the one or more processors operate according to a Peripheral Component Interconnect Express protocol.

In Example 78, the I/O System on Chip of any one of Examples 3 to 77 is disclosed, wherein reporting a failure comprises outputting a failure signal.

In Example 79, a method of integrated input/output ("I/O") processing is disclosed, comprising receiving I/O data from an I/O port and delivering the I/O data to a first processing logic and a second processing logic within one or more processors, redundantly processing the I/O data within the first processing logic and the second processing logic; and comparing an output of the first processing logic and an output of the second processing logic.

In Example 80, the method of integrated I/O processing of Example 79 is disclosed, further comprising determining an identity between the output of the first processing logic and the second processing logic, and in the case that the identity satisfies a predetermined threshold, delivering the output of the first processing logic to a next region of the one or more processors.

In Example 81, the method of integrated I/O processing of Examples 79 or 80 is disclosed, further comprising determining an identity between the output of the first processing logic and the second processing logic, and in the case that the identity does not satisfy a predetermined threshold, to report a failure.

In Example 82, the method of integrated I/O processing of any one of Examples 79 to 81 is disclosed, wherein the first processing logic and the second processing logic are integrated processing logics within the one or more processors.

In Example 83, the method of integrated I/O processing of any one of Examples 80 to 82 is disclosed, wherein the next region of the one or more processors is a coherent fabric.

In Example 84, the method of integrated I/O processing of any one of Examples 80 to 83 is disclosed, wherein the next region of the one or more processors is a core region, an uncore region, or a memory region.

In Example 85, the method of integrated I/O processing of any one of Examples 79 to 84 is disclosed, wherein the first processing logic and the second processing logic each comprise a logical portion of a physical layer ("logPHY"), a link layer, and a transaction layer.

In Example 86, the method of integrated I/O processing of Example 85 is disclosed, wherein the logPHY layer is a logical part of the physical layer for an input/output.

In Example 87, the method of integrated I/O processing of Example 85 is disclosed, wherein the Link Layer implements at least one or framing or de-framing rules.

In Example 88, the method of integrated I/O processing of Example 85 is disclosed, wherein the transaction layer is configured to perform at least one of enabling a protocol layer, enabling software discovery and performing an enumeration mechanism.

In Example 89, the method of integrated I/O processing of Example 85 is disclosed, wherein nc<--> Coh is a protocol converter from a non-coherent domain to a coherent domain and is configured to perform input/output memory management unit for virtualization support.

In Example 90, the method of integrated I/O processing of any one of Examples 79 to 89 is disclosed, wherein the first processing logic and the second processing logic are located within a same processor.

In Example 91, the method of integrated I/O processing of any one of Examples 79 to 90 is disclosed, wherein the first processing logic and the second processing logic are located adjacently within the same processor.

In Example 92, the method of integrated I/O processing of any one of Examples 79 to 91 is disclosed, further comprising receiving the I/O data from the I/O port, delivering the received I/O data to the first processing logic, and redundantly delivering the received I/O data to the second processing logic, and wherein said delivery occurs in lockstep.

In Example 93, the method of integrated I/O processing of any one of Examples 79 to 92 is disclosed, wherein the first processing logic is a master processing logic and the second processing logic is a slave processing logic.

In Example 94, the method of integrated I/O processing of any one of Examples 79 to 93 is disclosed, further comprising performing a checksum operation on the output of the first processing logic and the output of the second processing logic.

In Example 95, the method of integrated I/O processing of any one of Examples 79 to 94 is disclosed, wherein the first processing logic is in a first processor and the second processing logic is in a second processor.

In Example 96, the method of integrated I/O processing of Example 95 is disclosed, further comprising delivering an output of the second processing logic to a redundancy compare circuit for comparison with the output of the first processing logic.

In Example 97, the method of integrated I/O processing of Example 96 is disclosed, wherein the redundancy compare circuit is in the first processor.

In Example 98, the method of integrated I/O processing of any one of Examples 79 to 98 is disclosed, further comprising receiving the output of the second processing logic within a predetermined period following receipt of the output of the second processing logic.

In Example 99, the method of integrated I/O processing of any one of Examples 79 to 98 is disclosed, further comprising backpressuring the first processing logic to resolve an arrival time discrepancy between the output of the first processing logic and the output of the second processing logic.

In Example 100, the method of integrated I/O processing of any one of Examples 79 to 99, storing an output of the first processing logic in a memory until receipt of a corresponding output of the second processing logic.

In Example 101, a method of integrated I/O processing is disclosed, comprising
receiving I/O data and delivering the I/O data to one or more processors;
generating a duplicate I/O data of the first I/O data; processing the first I/O data and the duplicate I/O data on a single processing logic; comparing the processed first I/O data and the processed duplicate I/O data.

In Example 102, the method of integrated I/O processing of Example 101 is disclosed, further comprising determining an identity between the processed first I/O data and the processed duplicate I/O data, and in the case that the identity satisfies a predetermined threshold, delivering the first processed I/O data to a next region of the one or more processors.

In Example 103, the method of integrated I/O processing of Example 101 or 102 is disclosed, further comprising determining an identity between the processed first I/O data and the processed duplicate I/O data, and in the case that the identity does not satisfy a predetermined threshold, reporting a failure.

In Example 104, the method of integrated I/O processing of Example 102 or 103 is disclosed, wherein the next region of the one or more processors is a coherent fabric.

In Example 105, the method of integrated I/O processing of any one of Examples 102 to 104 is disclosed, wherein the next region of the one or more processors is a core region, an uncore region, or a memory region.

In Example 106, the method of integrated I/O processing of any one of Examples 101 to 105 is disclosed, wherein the I/O data comprises at least one of power data, reset data, clock data, configuration data, or any combination thereof.

In Example 107, the method of integrated I/O processing of any one of Examples 101 to 105 is disclosed, wherein the one or more processors operate according to a Peripheral Component Interconnect Express protocol.

In Example 108, the method of integrated I/O processing of any one of Examples 101 to 105 is disclosed, wherein reporting a failure comprises outputting a failure signal.

In Example 109, a non-transient computer readable medium configured to cause one or more processors to perform the method of any one of Examples 79 to 108 is disclosed.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An integrated input/output ("I/O") processing system, comprising:
    an I/O port, configured to receive I/O data and to deliver the I/O data to a processor;
    the processor, further comprising a first processing logic and a second processing logic, wherein the processor is configured to deliver the received I/O data to the first processing logic and to the second processing logic, and wherein the first processing logic and the second processing logic are configured to redundantly process the I/O data wherein the first processing logic and the second processing logic each comprise a logical portion of a physical layer ("logPHY"), a link layer, and a transaction layer; and
    a comparator, configured to compare an output of the first processing logic and an output of the second processing logic.

2. The I/O processing system of claim 1, wherein the comparator is configured to determine an identity between the output of the first processing logic and the second processing logic, and in the case that the identity satisfies a predetermined threshold, to deliver the output of the first processing logic to a next region of the processor.

3. The I/O processing system of claim 1, wherein the comparator is configured to determine an identity between the output of the first processing logic and the second processing logic, and in the case that the identity does not satisfy a predetermined threshold, to report a failure.

4. The I/O processing system of claim 2, wherein the next region of the processor is a core region, an uncore region, or a memory region.

5. The I/O processing system of claim 1, wherein the logPHY layer is a logical part of the physical layer for an input/output.

6. The I/O processing system of claim 1, wherein the Link Layer implements at least one of framing or de-framing rules.

7. The I/O processing system of claim 1, wherein the transaction layer is configured to perform at least one of enabling a protocol layer, enabling software discovery and performing an enumeration mechanism.

8. The I/O processing system of claim 1, wherein nc<--> Coh is a protocol converter from a non-coherent domain to a coherent domain and is configured to perform input/output memory management unit for virtualization support.

9. The I/O processing system of claim 1, wherein the I/O processing system is configured to operate within an autonomous vehicle.

10. The I/O processing system of claim 1, further comprising a lockstep module configured to receive the I/O data from the I/O port and to deliver the received I/O data to the first processing logic and to redundantly deliver the received I/O data to the second processing logic, and wherein the delivery of the received I/O data by the processor occurs via the lockstep module.

11. The I/O processing system of claim 1, wherein the first processing logic is a master processing logic and the second processing logic is a slave processing logic.

12. The I/O processing system of claim 1, wherein the comparator is configured to perform a checksum operation on the output of the first processing logic and the output of the second processing logic.

13. The I/O processing system of claim 1, wherein an output of the second processing logic is delivered to the redundancy compare circuit for comparison with the output of the first processing logic.

14. The I/O processing system of claim 13, wherein the processor is configured to backpressure the first processing logic to resolve an arrival time discrepancy between the output of the first processing logic and the output of the second processing logic.

15. A method of integrated input/output ("I/O") processing, comprising:
receiving I/O data from an I/O port and delivering the I/O data to a first processing logic and a second processing logic within a processor,
redundantly processing the I/O data within the first processing logic and the second processing logic wherein the first processing logic and the second processing logic each comprise a logical portion of a physical layer ("logPHY"), a link layer, and a transaction layer; and
comparing an output of the first processing logic and an output of the second processing logic.

16. The method of integrated I/O processing of claim 15, further comprising determining an identity between the output of the first processing logic and the second processing logic, and in the case that the identity satisfies a predetermined threshold, delivering the output of the first processing logic to a next region of the processor.

17. The method of integrated I/O processing of claim 15, further comprising determining an identity between the output of the first processing logic and the second processing logic, and in the case that the identity does not satisfy a predetermined threshold, to report a failure.

18. A non-transient computer readable medium configured to perform the method of:
receiving I/O data from an I/O port and delivering the I/O data to a first processing logic and a second processing logic within a processor,
redundantly processing the I/O data within the first processing logic and the second processing logic wherein the first processing logic and the second processing logic each comprise a logical portion of a physical layer ("logPHY"), a link layer, and a transaction layer; and
comparing an output of the first processing logic and an output of the second processing logic.

* * * * *